United States Patent [19]
Jolley et al.

[11] Patent Number: 5,405,546
[45] Date of Patent: Apr. 11, 1995

[54] PHOSPHORUS-CONTAINING COMPOSITIONS FOR REFRIGERATION SYSTEMS

[75] Inventors: Scott T. Jolley, Mentor; Richard M. Lange, Euclid; Frederick W. Koch, Willoughby Hills, all of Ohio

[73] Assignee: The Lubrizol Corporation, Wickliffe, Ohio

[21] Appl. No.: 111,227

[22] Filed: Aug. 24, 1993

Related U.S. Application Data

[63] Continuation of Ser. No. 824,739, Jan. 21, 1992, abandoned, which is a continuation of Ser. No. 525,358, May 17, 1990, abandoned.

[51] Int. Cl.$^6$ .................... C09K 5/04; C10M 105/74; C10M 107/48
[52] U.S. Cl. .................... 252/68; 252/49.8; 252/67
[58] Field of Search .................... 252/68, 67, 49.8

[56] References Cited

U.S. PATENT DOCUMENTS

| | | | |
|---|---|---|---|
| 2,084,950 | 6/1937 | Baxter et al. | 252/67 |
| 3,048,613 | 8/1962 | Ladd et al. | 260/461 |
| 3,408,428 | 10/1968 | Boschan et al. | 252/67 |
| 4,158,633 | 6/1979 | Papay | 252/32.7 |
| 4,199,461 | 4/1980 | Olund | 252/49.8 |
| 4,428,854 | 1/1984 | Enjo et al. | 252/69 |
| 4,431,557 | 2/1984 | Shimizu et al. | 252/52 |
| 4,450,116 | 5/1984 | Joachim et al. | 252/61 |
| 4,454,052 | 6/1984 | Shoji et al. | 252/68 |
| 4,755,316 | 7/1988 | Magid et al. | 252/68 |
| 4,927,554 | 5/1990 | Joffey et al. | 252/68 |
| 4,938,887 | 7/1990 | Grava et al. | 252/68 |
| 4,941,986 | 7/1990 | Colley et al. | 252/68 |
| 5,023,007 | 7/1991 | Grava et al. | 252/68 |
| 5,049,292 | 9/1991 | Grasshoff et al. | 252/49.8 |

FOREIGN PATENT DOCUMENTS

| | | | |
|---|---|---|---|
| 0336171 | 10/1989 | European Pat. Off. | C10M 107/34 |
| 2192165 | 2/1974 | France | C08K 5/49 |
| 58-061173 | 4/1983 | Japan | C09K 5/04 |
| 58-61173 | 4/1983 | Japan . | |
| 59-166581 | 9/1984 | Japan . | |
| 166581 | 9/1984 | Japan | C09K 5/00 |
| 1412632 | 11/1975 | United Kingdom | C10M 3/40 |
| 90/09387 | 8/1990 | WIPO . | |
| WO9009387 | 8/1990 | WIPO | C07F 9/40 |

OTHER PUBLICATIONS

Tetrahedron, 1966, vol. 22, pp. 2561–2573.

*Primary Examiner*—Christine Skane
*Attorney, Agent, or Firm*—James A. Cairns; Frederick D. Hunter, Sr.; David M. Shold

[57] ABSTRACT

The present invention is generally directed to a composition comprising:
(A) at least 50% by weight of a fluorine-containing hydrocarbon having one or two carbon atoms; and
(B) from about 9% to about 30% by weight of a phosphorus-containing lubricant composition comprising at least one compound characterized by the formula

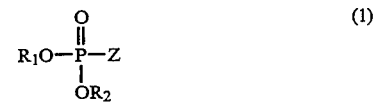

wherein $R_1$ and $R_2$ are each independently hydrocarbyl groups or hydrocarbyloxyalkylene groups and $R_1$ and $R_2$ taken together have from 2 to about 24 carbon atoms excluding any oxyalkylene carbon atoms; and Z is a hydrocarbyl group having 1 to about 18 carbon atoms.

The present invention provides phosphorous-containing compositions which are compatible with fluorine-containing hydrocarbons used in refrigerators and air-conditioners, and are accordingly useful as refrigeration liquids in refrigerators and air-conditioners including auto, home, and industrial air-conditioners.

11 Claims, No Drawings

PHOSPHORUS-CONTAINING COMPOSITIONS FOR REFRIGERATION SYSTEMS

This is a continuation of application Ser. No. 07/824,739, filed on Jan. 21, 1992, now abandoned, which is a continuation of application Ser. No. 07/525,358, filed on May 17, 1990, now abandoned.

FIELD OF THE INVENTION

This invention relates to phosphorus compositions and more particularly to phosphorus-containing compositions and their use as synthetic lubricants and as lubricants in liquid compositions containing liquid fluorine-containing hydrocarbons.

BACKGROUND OF THE INVENTION

Chlorofluorocarbons, generally referred to in the industry as CFCs, have been widely used in refrigeration systems. The use of CFCs has been diminishing in recent years because of demands from environmentalists for the reduction if not complete ban of the use of CFCs because of the detrimental effect of CFCs on the atmosphere's ozone layer. Examples of CFCs include CFC-11 which is chlorotrifluoromethane, CFC-12 which is dichlorodifluoromethane, and CFC-113 which is 1,2,2-trifluoro-1,1,2-trichloroethane. Finding a safe replacement of CFC refrigerants has been a problem which has been difficult to solve. Several replacement candidates have been suggested as alternatives to the fully halogenated hydrocarbons. Examples of safe alternatives include halogenated hydrocarbons containing at least one hydrogen atom such as HCFC-22 which is difluorochloromethane, HCFC-123 which is 1,1-dichloro-2,2,2-trifluoroethane, HFC-134a which is 1,1,1,2-tetrafluoroethane, and HCFC-141b which is 1,1-dichloro-1-fluoroethane.

The ozone depletion potential of these proposed substitutes is significantly less than the ozone depletion potential of the previously used CFCs. Ozone depletion potential is a relative measure of a capability of a material to destroy the ozone layer in the atmosphere. HCFC-22 and HFC-134a generally are recommended as being candidates in refrigerant applications, and HFC-134a is particularly attractive because its ozone depletion potential has been reported as being zero.

The problem with using these alternative materials is that the alternative materials have different solubility characteristics than the CFCs used in refrigerants presently. For example, mineral lubricating oil is incompatible (i.e., insoluble). Such incompatibility results in unacceptable compressor life in compressor-type refrigeration equipment including refrigerators and air-conditioners including auto, home and industrial air-conditioners. The problem is particularly evident in auto air-conditioning systems since the compressors are not separately lubricated, and the mixture of refrigerant and lubricant circulates throughout the entire system.

In order to perform as a satisfactory refrigeration liquid, the mixture of refrigerant and lubricant must be compatible and stable over a wide temperature range such as from about 0° C. and above 80° C. It is generally desirable for the lubricants to be soluble in the refrigerant at concentrations of about 5 to 15% over a temperature range of from −40° C. to 80° C. These temperatures generally correspond to the working temperatures of an automobile air-conditioning compressor. In addition to thermal stability, the refrigeration liquids must have acceptable viscosity characteristics which are retained even at high temperatures, and the refrigeration liquid should not have a detrimental effect on materials used as seals in the compressors.

U.S. Pat. No. 4,428,854, issued to Enjo et al, relates to an absorption refrigerant composition comprising 1,1,1,2-tetrafluoroethane and organic solvent capable of dissolving the ethane. Triethylphosphorotriamide, hexamethylphosphorictriamide, triethylenephosphate, triethylphosphate and like phosphate-type solvents are disclosed as phosphoro organic solvents capable of dissolving the ethane.

U.S. Pat. No. 4,431,557, issued to Shimizu et al, relates to a fluid composition comprising a fluorocarbon refrigerant, a hydrocarbon oil and an alkylene oxide additive. The fluid may contain additional additives such as load-carrying compounds such as phosphorus acid esters, phosphoric acid esters, thiophosphoric acid esters, organic sulfur compounds or organic halide compounds, etc.

U.S. Pat. No. 4,454,052, issued to Shoji et al, relates to stabilized absorption composition comprising (A) a halogenated hydrocarbon refrigerant, (B) a liquid absorbant of a polyethylene glycol methyl ether, and (C) at least one stabilizer selected from phosphite esters, epoxy compounds and organo tin compounds.

U.S. Pat. No. 4,755,316, issued to Magid et al, relates to lubricants for refrigeration systems using tetrafluoroethane. The fluids employ certain polyoxyalkylene glycols as lubricating oils. Magid et al discloses additives which may be used to enhance performance in Table D. Among the additives listed are phosphates, thiophosphates, and phosphites.

Reactions of trialkyl phosphites with various alpha,-beta-unsaturated acids, esters, ketones, aldehydes, amides and nitriles in protonating solvents has been described in literature. For example, see *Tetrahedron*, 1966, Vol. 22, pages 2561–2573. Reactions of dialkyl phosphites with activated olefins such as those mentioned above by a free radical mechanism also have been described in the literature such as, for example, in *Methoden der Organische Chemie*, Vol. 12/1, pages 463–490, Houben-Weyl. Phosphorus-containing compositions prepared by the above processes are useful in a variety of applications. For example, they are useful as fire-retardant additives.

SUMMARY OF THE INVENTION

This invention relates to a composition comprising:
(A) a major amount of a fluorine-containing hydrocarbon containing one or two carbon atoms; and
(B) a minor amount of a phosphorus-containing composition comprising at least one compound characterized by the following formula;

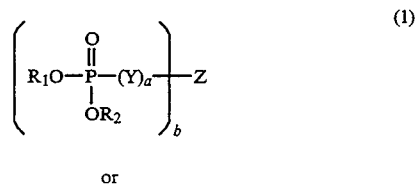

(1)

or

-continued

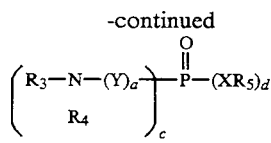

wherein $R_1$ and $R_2$ are each independently hydrocarbyl groups or hydrocarbyloxyalkylene groups and $R_1$ and $R_2$ taken together have a total of 2 to about 24 carbon atoms excluding any oxyalkylene carbon atoms;

a is 0 or 1;
b is 1 or 2;
c is 1, 2 or 3;
d is 0, 1 or 2, provided that $c+d=3$;
if b is 1, Z is selected from the group consisting of —$R_5$, —$XR_5$, —$N(H)R_5$, —$N(R_5)_2$, —$C(X)R_5$, —CN, —S-(O)$R_5$, —S(O)$_2R_5$, —S(O)$_2N(R_3)(R_4)$ and

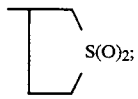

if b is 2, Z is —$N(R_5)$—,
X is oxygen or sulfur;
Y is a hydrocarbylene group having 1 to about 20 carbon atoms;
$R_5$ is a hydrocarbyl group having 1 to about 18 carbon atoms;
$R_3$ and $R_4$ are each independently hydrogen; or a hydrocarbyl group having 1 to about 24 carbon atoms; or $R_3$ and $R_4$ taken together form a heterocyclic ring.

The present invention provides compositions which are useful as refrigeration liquids in refrigerators and air-conditioners including auto, home and industrial air-conditioners. The invention provides phosphorus-containing compositions which are compatible with fluorine-containing hydrocarbons used in refrigerators and air-conditioners. The phosphorus-containing compositions act as a lubricant for air-conditioners.

DETAILED DESCRIPTION OF THE INVENTION

In the specification and claims, unless the context indicates otherwise, the use of the term alkyl-group is meant to encompass all isomeric arrangements of the group, such as primary, secondary, and tertiary, as well as iso- and neo-arrangements of the group.

In the specification and claims, the use of the term alkylene or hydrocarbylene is meant to encompass divalent hydrocarbon or hydrocarbyl groups. For instance, propylene is a divalent hydrocarbon group having 3 carbon atoms.

Throughout this specification and claims, all parts and percentages are by weight, temperatures are in degrees Celsius, and pressures are at or near atmospheric unless otherwise clearly indicated.

The term "hydrocarbyl" includes hydrocarbon, as well as substantially hydrocarbon, groups. Substantially hydrocarbon describes groups which contain non-hydrocarbon substituents which do not alter the predominantly hydrocarbon nature of the group. Non-hydrocarbon substituents include halo (especially chloro and fluoro), hydroxy, alkoxy, mercapto, alkylmercapto, nitro, nitroso, sulfoxy, etc., groups. The hydrocarbyl group may also have a heteroatom, such as sulfur, oxygen, or nitrogen, in a ring or chain. In general, no more than about 2, preferably no more than one, non-hydrocarbon substituent will be present for every ten carbon atoms in the hydrocarbyl group. Typically, there will be no such non-hydrocarbon substituents in the hydrocarbyl group. Therefore, the hydrocarbyl group is purely hydrocarbon.

The term "lower" as used herein in conjunction with terms such as hydrocarbyl, alkyl, alkenyl, alkoxy, and the like, is intended to describe such groups which contain a total of up to 7 carbon atoms.

(A) Fluorine-Containing Hydrocarbon.

The fluorine-containing hydrocarbon present in the liquid compositions contain at least one C—H bond as well as C—F bonds. In addition to these two essential types of bonds, the hydrocarbon also may contain other carbon-halogen bonds such as C—Cl bonds. Because the liquid compositions of the present invention are primarily intended for use as refrigerants, the fluorine-containing hydrocarbon preferably contains one or two carbon atoms, and more preferably two carbon atoms.

As noted above, the fluorine-containing hydrocarbons useful in the liquid compositions of the present invention may contain other halogens such as chlorine. However, in one preferred embodiment, the hydrocarbon contains only carbon, hydrogen and fluorine. These compounds containing only carbon, hydrogen and fluorine are referred to herein as fluorohydrocarbons (hydrofluorocarbons or HFCs). The hydrocarbons containing chlorine as well as fluorine and hydrogen are referred to as chlorofluorohydrocarbons (hydrochlorofluorocarbons or HCFCs). The fluorine-containing hydrocarbons useful in the composition of the present invention are to be distinguished from the fully halogenated hydrocarbons which have been and are being used as propellants, refrigerants and blowing agents such as CFC-11, CFC-12 and CFC-113 which have been described in the background.

Specific examples of the fluorine-containing hydrocarbons useful in the liquid compositions of the present invention, and their reported ozone depletion potentials are shown in the following Table I.

TABLE I

| Compound Designation | Formula | ODP* |
|---|---|---|
| HCFC-22 | $CHClF_2$ | 0.05 |
| HCFC-123 | $CHCl_2CF_3$ | <0.05 |
| HCFC-141b | $CH_3CCl_2F$ | <0.05 |
| HFC-134a | $CH_2FCF_3$ | 0 |

*Ozone depletion potential as reported in Process Engineering, pp. 33–34, July, 1988.

Examples of other fluorine-containing hydrocarbons which may be useful in the liquid compositions of the present invention include trifluoromethane, 1,1,1-trifluoroethane, 1,1-difluoroethane, and 1,1,2,2-tetrafluoroethane.

In general, fluorine-containing hydrocarbons which are useful as refrigerants are fluoromethanes and fluoroethanes boiling at a relatively low temperature at atmospheric pressure, e.g., below 30° C. The useful fluorocarbon refrigerants serve to transfer heat in a refrigeration system by evaporating and absorbing heat at a low temperature and pressure, e.g., at ambient temperature and atmospheric pressure, and by releasing heat on condensing at a higher temperature and pressure.

The liquid compositions of the present invention contain a major amount of the fluorine-containing hydrocarbon. More generally, the liquid compositions will comprise greater than about 50% up to about 99% by weight of the fluorine-containing hydrocarbon. In another embodiment, the liquid compositions contain from about 70% to about 99% by weight of the fluorine-containing hydrocarbon.

B. Phosphorus-Containing Compositions

In addition to the fluorine-contraining hydrocarbon, the compositions of the present invention comprises
(B) a minor amount of a phosphorus-containing composition comprising at least one compound characterized by the following formula

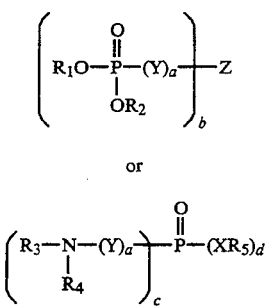

1 or

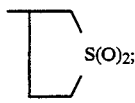

2 wherein $R_1$ and $R_2$ are each independently hydrocarbyl groups or hydrocarbyloxyalkylene groups and $R_1$ and $R_2$ taken together have 2 to about 24 carbon atoms excluding any oxyalkylene carbon atoms;

a is 0 or 1;

b is 1 or 2;

c is 1, 2 or 3;

d is 0, 1 or 2, provided that $c+d=3$;

if b is 1, Z is selected from the group consisting of $-R_5$, $-XR_5$, $-N(H)R_5$, $-N(R_5)_2$, $-C(X)R_5$, $-CN$, $-S(O)R_5$, $-S(O)_2R_5$, $-S(O)_2N(R_3)(R_4)$ and $$\underset{\underset{}{\diagdown}}{\diagup} S(O)_2;$$

if b is 2, Z is $-N(R_5)-$,

X is oxygen or sulfur;

Y is a hydrocarbylene group having 1 to about 20 carbon atoms;

$R_5$ is a hydrocarbyl group having 1 to about 18 carbon atoms;

$R_3$ and $R_4$ are each independently hydrogen; or a hydrocarbyl group having a total of 2 to about 24 carbon atoms; or $R_3$ and $R_4$ taken together form a heterocyclic ring.

The phosphorus-containing compositions characterized by the above formulae are preferably free of acetylenic and aromatic unsaturation. Compounds which contain such unsaturation generally are insoluble in the fluorine-containing hydrocarbons and in particular, in 1,1,1,2-tetrafluoroethane. The soluble lubricants of this invention also are preferably free of olefinic unsaturation except that some olefinic unsaturation may be present so long as the lubricant is soluble.

In formula (1), $R_1$ and $R_2$ are each independently hydrocarbyl groups or hydrocarbyloxyalkylene groups where $R_1$ and $R_2$ taken together have a total of 2 to about 24 carbon atoms excluding any oxyalkylene carbon atoms.

For purposes of this invention the total number of aliphatic carbon atoms of $R_1$ and $R_2$ must have from 2 to about 24 carbon atoms, preferably from 2 to about 18, more preferably from 2 to about 16. The total number of aliphatic carbon atoms is the total of all carbon atoms present in the hydrocarbyl group or hydrocarbyloxyalkylene group minus the number, if any, of carbon atoms in the oxyalkylene portion of the hydrocarbyloxyalkylene group. Generally the total number of aliphatic carbon atoms will be the total number of alkyl carbon atoms, i.e., the sum of the carbon atoms of any alkyl group plus the carbon atoms of any hydrocarbyl portion of the hydrocarbyloxyalkylene group.

Preferably, when $R_1$ or $R_2$ is a hydrocarbyl group, $R_1$ and $R_2$ each independently have 1 to about 8 carbon atoms. Most preferably, $R_1$ and $R_2$ are each independently an alkyl having 1 to about 8 carbon atoms, preferably having from 1 to about 6 carbon atoms. In another embodiment, $R_1$ and $R_2$ are selected from the group consisting of straight alkyl groups having from 1 to about 4 carbon atoms and branched alkyl groups having from 1 to about 8 carbon atoms. $R_1$ and $R_2$ may both be straight alkyl groups or branched alkyl groups. Also encompassed by the present invention is where $R_1$ is a branched alkyl group and $R_2$ is a straight chain alkyl group. $R_1$ and $R_2$ are selected from the group consisting of methyl, ethyl, propyl, butyl, pentyl, hexyl, heptyl and octyl groups.

When $R_1$ or $R_2$ is a hydrocarbyloxyalkylene group, preferably $R_1$ and $R_2$ are a hydrocarbyloxyalkylene group having from 1 to about 20 oxyalkylene groups and from 1 to about 18 carbon atoms in the hydrocarbyl group. Preferably $R_1$ or $R_2$ is an alkyloxyalkylene group. In one embodiment, the hydrocarbyloxyalkylene group preferably has one oxyalkylene group, more preferably an oxyethylene or an oxypropylene group and from 1 to about 12 carbon atoms in the hydrocarbyl group, more preferably 1 to about 6, more preferably 1 to about 4. Examples of $R_1$ or $R_2$ groups include methoxyethyl, methoxypropyl, ethoxyethyl, ethoxypropyl, propoxyethyl, propoxypropyl, butoxyethyl and butoxypropyl.

In another embodiment, $R_1$ or $R_2$ is a hydrocarbyloxyalkylene which is a hydrocarbyl terminated polyoxyalkylene. Preferably, $R_1$ or $R_2$ is a hydrocarbyl terminated polyoxyalkylene group having from 2 to about 30 oxyalkylene groups, more preferably about 2 to about 20, more preferably about 3 to about 15, more preferably about 3 to about 10. The alkylene portion of the group preferably has from 1 to about 8 carbon atoms, more preferably about 2 to about 4, more preferably 2 or 3. The alkylene portion is preferably ethylene, propylene or mixtures thereof. The hydrocarbyl portion of the hydrocarbyl terminated polyoxyalkylene is defined the same as when $R_1$ or $R_2$ is a hydrocarbyl group above.

When $R_1$ or $R_2$ is a hydrocarbyl terminated polyoxyalkylene group, $R_1$ or $R_2$ may be derived from a hydrocarbyl terminated polyoxyalkylene glycol. The hydrocarbyl terminated polyoxyalkylene glycols are produced generally by treating an aliphatic alcohol with an excess of an alkylene oxide such as ethylene oxide or propylene oxide. For example, from about 6 to about 40 moles of ethylene oxide or propylene oxide may be condensed with the aliphatic alcohol. Preferably, the hydrocarbyl terminated polyoxyalkylene is an alkyl terminated polyoxyalkylene. A variety of alkyl terminated polyoxyalkylenes are known in the art, and many are available commercially.

The alkyl terminated polyoxyalkylene glycols useful in the present invention are available commercially under such trade names as "TRITON®" from Rohm & Haas Company, "Carbowax®" and "TERGITOL®" from Union Carbide, "ALFONIC®" from Conoco Chemicals Company, and "NEODOL®" from Shell Chemical Company. The TRITON® materials are identified generally as polyethoxylated alcohols or phenols. The TERGITOLS® are identified as polyethylene glycol ethers of primary or secondary alcohols; the ALFONIC® materials are identified as ethoxylated linear alcohols which may be represented by the general structural formula $$CH_3(CH_2)_dCH_2(OCH_2CH_2)_eOH$$

wherein d varies between 4 and 16 and e is a number between about 3 and 11. Specific examples of ALFONIC® ethoxylates characterized by the above formula include ALFONIC® 1012-60 wherein d is about 8 to 10 and e is an average of about 5 to 6; ALFONIC® 1214-70 wherein d is about 10-12 and e is an average of about 10 to about 11; ALFONIC® 1412-60 wherein d is from 10-12 and e is an average of about 7; and ALFONIC® 1218-70 wherein d is about 10-16 and e is an average of about 10 to about 11.

The Carbowax® methoxy polyethylene glycols are linear ethoxylated polymer of methanol. Examples of these materials include Carbowax® methoxy polyethylene glycol 350, 550 and 750, wherein the numerical value approximates molecular weight.

The NEODOL® ethoxylates are ethoxylated alcohols wherein the alcohols are a mixture of alcohols containing from 12 to about 15 carbon atoms, and the alcohols are partially branched chain primary alcohols. The ethoxylates are obtained by reacting the alcohols with an excess of ethylene oxide such as from about 3 to about 12 or more moles of ethylene oxide per mole of alcohol. For example, NEODOL® ethoxylate 23-6.5 is a partially branched chain alcoholate of 12 to 13 carbon atoms with an average of about 6 to about 7 ethoxy units.

In formula (1) and formula (2), Y is a hydrocarbylene group having 1 to about 20 carbon atoms, preferably 1 to about 12 carbon atoms. More preferably, Y is an alkylene group. Most preferably, Y is selected from a group consisting of methylene, ethylene, propylene and butylene.

In formula (1), a is 0 or 1. Preferably, a is 0 when Z is —$R_5$. Also preferably a is 1 when Z is selected from the group consisting of:

—$XR_5$, —$N(H)R_5$, —$N(R_5)_2$, —$N(R_5)$—, —$C(X)R_5$,
—CN, —$S(O)R_5$, —$S(O)_2R_5$, —$S(O)_2N(R_3)(R_4)$
and

When b=1, Z is —$R_5$, —$XR_5$, —$N(R_5)_2$, —$C(X)R_5$,
—CN, —$S(O)R_5$, —$S(O)_2R_5$, —$S(O)_2N(R_3)$ ($R_4$) or

When b=2, Z is —$N(R_5)$—.

In a preferred embodiment, b=1 and Z is selected from the group consisting of —$R_5$; —$S(O)_2N(R_4)$; —$S(O)_2R_5$ and

In a more preferred embodiment, b=1 and Z is selected from the group consisting of —$R_5$ and

In formula (1) and formula (2), $R_5$ is a hydrocarbyl group having 1 to about 18 carbon atoms, preferably, from 1 to about 14. More preferably, $R_5$ is an alkyl group. $R_5$ may be selected from the group consisting of methyl, ethyl, propyl, butyl, pentyl, octyl, dodecyl and octadecyl. $R_5$ is preferably dodecyl.

In another embodiment of the present invention $R_1$, $R_2$ and $R_5$ taken together contain a total of 3 to about 26 aliphatic carbon atoms, preferably, 3 to about 22, more preferably 3 to about 20, and more preferably 3 to about 16. The total number of aliphatic carbon atoms is calculated and discussed above.

In formula (2), $R_3$ and $R_4$ are each independently selected from the group consisting of hydrogen; and a hydrocarbyl group having 1 to about 24 carbon atoms. $R_3$ and $R_4$ taken together may form a heterocyclic ring. Preferably $R_3$ and $R_4$ are alkyl groups having from 1 to about 8 carbon atoms. In a preferred embodiment $R_3$ and $R_4$ are selected from the group consisting of branched alkyl groups having from 1 to about 8 carbon atoms and straight chain alkyl groups having from 1 to about 4 carbon atoms. $R_3$ and $R_4$ are selected from the group consisting of methyl, ethyl, propyl, and butyl.

$R_3$ and $R_4$ may join to form a heterocyclic ring with a nitrogen atom. The heterocyclic ring may contain more than one heteroatom. For instance, $R_3$ and $R_4$ may combine to form heterocyclic rings selected from the group consisting of imidazoline, a oxazoline, a pyridine, and a morpholine. Preferably, $R_3$ and $R_4$ join together to form a morpholine. The morpholine may be substituted.

In formula (2), c is 1, 2 or 3. Also d is 0, 1 or 2. It is provided that c+d must equal 3 to fulfill the valence requirements of the phosphorus atom. Preferably c is 1 and d is 2.

In formula (2), X is oxygen or sulfur. Preferably, X is oxygen.

The materials described by formula (1) above may be prepared by the reaction of a phosphite with an olefin or a vinyl or allyl containing compound selected from the group consisting of an ether, a sulfone, a ketone, a sulfoxide, a nitrile or an aldehyde.

Vinyl or allyl compounds useful in the present invention include but are not limited to methyl vinyl ether, ethyl vinyl ether, methyl vinyl ketone, ethyl vinyl ketone, acrylonitrile, vinyl sulfoxide, vinyl sulfone, allyl butyl ether, allyl amine, allyl cyanide and allyl ethyl ether.

Olefin compounds useful in the above identified reaction include olefins having from 2 to about 24 carbon atoms, preferably 6 to about 18 carbon atoms, and most preferably about 8 to about 18 carbon atoms. These olefinic compounds may be alkylene tetramers of ethylene, propylene and butylene. For instance, an oligomeric olefin of propylene (tetrapropylene) is useful in the present invention. Other useful olefins include octene, dodecene, hexene and the like.

The phosphites may be reacted with the olefins or vinyl or allyl compounds under free radical conditions. Any free radical initiator is useful provided the initiator has a half life sufficient to cause addition of the phosphite. The conditions and free radical initiators are known in the art. Examples of free radical initiators useful in the present invention include di-tertiary-butyl peroxide, benzoyl peroxide and other initiators. The reaction is conducted at a temperature from about 75° C. to about 175° C., with about 100° C. to about 150° C. being preferred. The reaction usually is accomplished in about 0.5 to about 12 hours, with about 4 to 6 hours being preferred. Reactions of phosphites with alpha, beta unsaturated systems is disclosed in *Tetrahedron*, 1966, Vol. 22, pages 2561–2573 and *Methoden der Organische Chemie*, Vol. 12/1, pages 463–490, Houben-Weyl, those disclosures are hereby incorporated by reference.

Compounds encompassed under formula (1), when Z is $R_5$ and a is 0 may also be prepared by the reaction of a phosphite with an alkyl halide. The reaction occurs between about 50° C. and about 200° C., with about 75° C. to about 150° C. being preferred. It is preferred that the alkyl halide be a primary alkyl halide. The alkyl groups useful in the above-identified reaction are selected from the group consisting of ethyl, propyl, butyl, hexyl, octyl, and dodecyl. Dodecyl and octyl are preferred. Preferred alkyl halides are chloroalkyl halides and bromoalkyl halides.

Another method to make compounds encompassed by formula (1) is by the reaction of a phosphite with an aldehyde or ketone and the vinyl or allyl compound. The reaction occurs between about 75° C. and about 200° C. with about 75° C. to about 150° C. being preferred. Although the reaction may occur without catalyst, it may be beneficial to use a basic catalyst, such as sodium hydroxide. Useful aldehydes include aldehydes having from 1 to about 12 carbon atoms, preferably 1 to about 6 carbon atoms, or aldehyde synthons. Aldehyde synthons are materials that although not being an aldehyde, react as an aldehyde. A well known aldehyde synthon is paraformaldehyde, which is preferred. Preferred aldehydes are paraformaldehyde, formaldehyde, ethanal, and propanal, with paraformaldehyde and formaldehyde preferred.

Materials defined by formula (2) may be prepared by the reaction of a phosphorus oxychloride with an amine. The reaction occurs between about 50° C. and about 200° C., with about 75° C. to about 150° C. preferred. The amines that are useful in the present reaction are primary or secondary amines and contain 2 to about 24 carbon atoms. Preferably, the amines contain 1 to about 18 carbon atoms, preferably 14 or fewer carbon atoms. Examples of these amines include but are not limited to propyl amine, butyl amine, hexyl amine, octyl amine and dodecyl amine.

The following examples describe phosphorus-containing compositions useful in the present invention.

EXAMPLE 1

In a suitable vessel, 723 parts (4.25 moles) of polypropylene tetramer with 725 parts (5.25 moles) of diethyl-hydrogen phosphite are mixed and then heated to 130° C. Then 50 grams of di-t-butylperoxide are added in 5 gram increments over 8 hours. The reaction is stripped at 100° C. and 30 millimeters of mercury. The residue (major portion) is the product.

EXAMPLE 2

In a suitable vessel, 388 parts (2 moles) of dibutyl-phosphite and 236 parts (2 moles) of 3-sulfolene are mixed and then heated to 100° C. One part of sodium hydroxide and 60 parts (2 moles) of paraformaldehyde are added to the mixture which is maintained at 100° C. for 3 hours. The reaction is vacuum stripped to 150° C. and 30 millimeters of mercury. The residue (major amount) is the product.

Liquid Compositions

The liquid compositions of the present invention comprise a major amount of a fluorine-containing hydrocarbon and a minor amount of at least one soluble phosphorus-containing composition of the types described above. "Major amount" is meant to include an amount equal to or greater than 50% by weight such as 50.5%, 70%, 99%, etc. The term "minor amount" includes amounts less than 50% by weight such as 1%, 5%, 20%, 30% and up to 49.9%. Generally, the fluorine-containing hydrocarbon makes the balance of the liquid compositions, i.e., is present in the amount to provide 100% of the liquid composition. For instance, if the phosphorus-containing composition is present at 5% by weight, then the fluorine-containing hydrocarbon would be present in an amount to provide 100% by weight of a liquid composition or, in this case, 95% by weight. In one embodiment, the liquid compositions of the present invention will comprise from about 70 to about 99% of the fluorine-containing hydrocarbon (A) and from about 0.1% to about 30%, preferably from about 0.5% to about 25%, more preferably from about 1% to about 22% by weight of the phosphorus-containing compositions (B). In another embodiment, the phosphorus-containing compositions (B) may be used as a lubricant or a component of a lubricant formulation. (B) is present, as a lubricant, in an amount from about 9% to about 30%, preferably about 9% to about 25%, more preferably about 10% to about 20% by weight of the liquid compositions. Lubricants for stationary compressor system should have a kinematic viscosity at 100° C. of at least 3 centistokes (cSt), preferably about 3 cSt to about 2000 cSt, more preferably from about 3 to about 20. For mobile air-conditioning systems, the lubricant should have a viscosity greater than about 10 cSt, preferably from about 10 to about 2000, more preferably from about 10 to 50.

In another embodiment, the phosphorus-containing compositions (B) are present as additives in a lubricant formulation. When (B) is an additive, it is present in an amount from about 0.1% to about 8%, preferably about 0.5% to about 6%, more preferably from 0.75% to about 5% by weight, i.e., fluorine-containing hydrocarbon plus lubricant. Preferably the lubricant formulation contains a polyoxyalkene glycol (C-1) or a carboxylic ester (C-2 or C-3) about 25% by weight of the liquid composition, more preferrably from about 10 to about 20%.

(C) Polyoxyalkylene Glycol or Carboxylic Ester

The polyoxyalkylene glycol (C-1) or carboxylic ester (C-2 & C-3) is present in an amount up to where the total amount of phosphorus-containing composition plus the amount of polyoxyalkylene glycol or carboxylic ester is in a "minor amount" up to about 49.9% by weight. Preferably the polyoxyalkylene glycol or carboxylic ester is present in an amount up to 40% by weight, more preferably up to 30% by weight, more preferably up to 20% by weight.

In another embodiment, the combined amount of the phosphorus-containing composition and the polyoxyalkylene glycol or carboxylic ester are present in an amount from about 5% to about 40%, preferably from about 7.5% to about 30%, more preferably from about 10% to about 20%, where all percentages are by weight of the liquid composition.

Useful polyoxyalkylene glycols (C-1) have a molecular weight between about 300 and about 2000, a viscosity of about 25 to 150 centistokes at 37° C., and a viscosity index of at least 20. The polyoxyalkylene glycols may be polyoxyethylene glycols or polyoxypropylene glycols. Useful polyoxyethylene glycols are available from Union Carbide under the trade name Carbowax PEG 600, 1000 and 1450. The polyoxyalkylene glycols are preferrably polyoxypropylene glycols where the oxypropylene units are at least 80% of the total. The remaining 20% may be ethylene oxide or butylene oxide or other such esters, olefins and the like which may be polarized with polypropylene oxide. Useful polyoxypropylene glycols are available from Union Carbide under the trade names NIAX 425 and NIAX 1025. Useful polyoxypropylene glycols are available from Dow Chemical and sold by the trade names PPG-1200 and PPG-2000.

Polyoxyalkylene glycols useful as refrigerator lubricants are described in U.S. Pat. No. 4,755,316 issued to Magid et al. The patent is hereby incorporated by reference for its disclosure to polyoxyalkylene glycols and their use in refrigeration systems.

In one embodiment, the carboxylic ester comprises (C-2) at least one carboxylic ester compound characterized by the following formula $$R'O(R'_1O)_qC(O)R'_2 \qquad \text{(IV)}$$

or $$R'_3OC(O)R'_2 \qquad \text{(V)}$$

wherein R' is a hydrocarbyl group of at least 2 carbon atoms, $R'_1$ is a hydrocarbylene group, $R'_2$ is H, hydrocarbyl, $-CF_3$, $-R'_4CN$, $-R'_4-NO_2$, or $R'_5OCH(R'_6)-$, $R'_3$ is a $-R'_4CF_3$, $-R'_4CN$ or $-R'_4NO_2$ group, provided that $R'_3$ may be a hydrocarbyl group when $R'_2$ is $-R'_4CN$, q is an integer from 1 to about 50, $R'_4$ is a hydrocarbylene group, $R'_5$ is $-H$, a lower hydrocarbyl group or $R'_7C(O)-$ where $R'_7$ is a hydrocarbyl group, and $R'_6$ is $-H$ or a lower hydrocarbyl group.

In the above Formulae (IV) and (V), R' is a hydrocarbyl group of at least 2 carbon atoms and more particularly is an alkyl group containing from 2 to about 50 carbon atoms. Branched-chain alkyl groups are particularly useful as R' groups since the presence of the branching appears to improve the solubility of the lubricant in the fluorine-containing hydrocarbon. Examples of R' groups include ethyl, propyl butyl, hexyl octyl, decyl, dodecyl, tridecyl, hexadecyl, octadecyl, higher alkyl groups, and mixtures of one or more of these. $R'_1$ is a hydrocarbylene group preferably containing from 1 to about 7 carbon atoms. Alkylene groups such as methylene, ethylene, propylene, 2-methyl ethylene, 2-ethyl ethylene, etc., are examples of hydrocarbylene groups useful as $R'_1$. When $R'_2$ is a hydrocarbyl group, $R'_2$ generally will contain from 1 to about 20 carbon atoms and more often will be a lower alkyl group such as methyl, ethyl, propyl, butyl, etc.

$R'_2$ in Formulae (IV) and (V) also may be hydrogen, $-CF_3$, $-R'_4CN$, $-R'_4NO_2$ or $R'_5OCH(R'_6)-$ wherein $R'_4$ is a hydrocarbylene group, preferably an alkylene group, $R'_5$ is a lower hydrocarbyl group or $R'_7C(O)-$ wherein $R'_7$ is a hydrocarbyl group, and $R'_6$ is $-H$ or a lower hydrocarbyl group. The hydrocarbylene group $R'_4$, in one embodiment, is an alkylene group containing from 1 to about 20 carbon atoms, and the alkylene group may be straight chain or branched chain. $R'_5$ may be a lower hydrocarbyl group, and specific examples of such groups include methyl, ethyl, propyl, etc. $R'_7$ is a hydrocarbyl group which may contain from 1 to about 20 carbon atoms, and in one embodiment this hydrocarbyl group also is a lower hydrocarbyl group.

The compositions represented by Formula (IV) may be prepared by techniques well known in the art. In one embodiment, esters of the type represented by Formula (IV) are prepared by the reaction of a carboxylic acid $R'_2COOH$ (or its anhydride) with an alkoxy alcohol such as represented by the formula $R'O(R'_1O)_qH$ wherein R', $R'_1$ and q are as defined above with respect to Formula (IV). The alkoxy alcohols are also referred to as hydrocarbyl terminated polyoxyalkylene glycols and are discussed above. In one embodiment, $R'_1$ is a branched-chain hydrocarbylene group containing 3, 4, or 5 carbon atoms. For example $R'_1$ may be a methyl- or ethyl-substituted ethylene group derived from propylene oxide or butylene oxide.

The carboxylic acid, $R'_2COOH$, which may be reacted with the alkoxy alcohol, can be any of the carboxylic acids wherein $R'_2$ is H, hydrocarbyl, $-CF_3$, $-R'_4CN$, $-R'_4NO_2$, or $R'_5OCH(R'_6)-$ wherein $R'_4$, $R'_5$ and $R'_6$ are as defined above with respect to Formulae (IV) and (V). The following examples will illustrate the various types of carboxylic acids exemplified by the formula $R'_2COOH$ and some anhydrides of such acids: formic acid, acetic acid, acetic anhydride, propionic acid, trifluoroacetic acid, trifluoroacetic acid anhydride, cyanoacetic acid, cyanoundecanoic acid, nitroacetic acid, 3-nitropropionic acid, glycolic acid, lactic acid, methoxyacetic acid, ethoxyacetic acid, acetylacetic acid, etc.

In another embodiment, the carboxylic esters may be characterized by the following formula $$R'_3OC(O)R'_2 \qquad \text{(V)}$$

wherein $R'_2$ is —H, hydrocarbyl, hydrocarbyloxy hydrocarbyl, —$CF_3$, —$R'_4CN$, —$R'_4NO_2$ or $R'_5OCH(R'_6)$—, and $R'_3$ is a —$R'_4CF_3$, —$R'_4CN$ or —$R'_4NO_2$ group wherein $R'_4$, $R'_5$ and $R'_6$ are as defined in Formula (IV), provided that $R'_3$ may be a hydrocarbyl group when $R'_2$ is —$R'_4CN$. Such carboxylic esters can be prepared by techniques known in the art such as, for example, by the reaction of a carboxylic acid, $R'_2COOH$, as described above, or the anhydride of said acid with hydroxy-containing compounds such as the following: $R'_3OH$; $HOR'_4CN$; $HOR'_4NO_2$; $HOR'_4CF_3$; wherein $R'_4$ is a hydrocarbylene group. In one embodiment, $R'_4$ is a straight chain or branched chain alkylene group, containing from about 1 to 20 carbon atoms and more particularly, from 1 to about 10 carbon atoms.

As noted above, $R'_3$ in Formula (V) may be a hydrocarbyl group when $R'_2$ is —$R'_4CN$. The hydrocarbyl group may contain from 1 to 50 carbon atoms, more preferably from 1 to 20. $R'_3$ is preferably a branched-chain alkyl group containing from 3 to about 20 carbon atoms. Esters characterized by Formula (V), where $R'_3$ is a hydrocarbyl group, are prepared by reacting the carboxylic acid ($R'_2COOH$) or its anhydride with an alcohol $R'_3OH$ wherein $R'_3$ is as defined above. Examples of useful alcohols include methyl alcohol, ethyl alcohol, amyl alcohol, octyl alcohol, isooctyl alcohol, decyl alcohol, isodecyl alcohol, tridecyl alcohol, octadecyl alcohol, etc.

The hydroxy compound reacted with the carboxylic acid or anhydride also may be characterized by the formula, $HOR'_4CN$, wherein $R'_4$ is a hydrocarbylene group. Specific examples of such hydroxy-containing compounds include 2-cyanoethanol, 2-cyano-1-propanol, etc. Examples of hydroxy compounds characterized by the formula $HOR'_4NO_2$ which can be reacted with the acid or anhydride compounds include 2-nitro ethanol; 2-methyl-2-nitropropanol, 3-nitro-2-butanol; 2-nitro-1-propanol; 3-nitro-2-pentanol; etc. Examples of hydroxy compounds characterized by the formula $HOCH_2CF_3$ include 2,2,2-trifluoroethanol; 1,1,1-trifluoro-2-propanol; 2-trifluoromethyl-2-propanol; etc.

The carboxylic ester compounds useful in the present invention characterized by Formulae (IV) and (V) can be prepared by reacting a carboxylic acid ($R'_2COOH$) or its anhydride with any of the above-described hydroxy-containing compounds. Generally, about equivalent amounts of the acid or anhydride and the hydroxy-containing compounds are utilized in the reaction which is a typical esterification reaction. Although no catalyst is required for the anhydrides, the esterification reaction with carboxylic acid generally is acid catalyzed. Typically, about 1% by weight of an acid catalyst such as a mineral acid or para-toluene sulfonic acid is utilized in the reaction mixture. The mixture is heated and stirred while removing water when the free acids are used and, optionally excess carboxylic acid. The reaction may be conducted in the presence of solvent such as hydrocarbon solvents including toluene, xylene, etc.

The following examples illustrate the preparation of the carboxylic esters (C-2) useful in the present invention. Neutralization number is the amount in milligrams (mg) of potassium hydroxide (KOH) or hydrochloric acid (HCl) to neutralize one gram of sample.

EXAMPLE 3

Into a reaction vessel there are charged 244 parts of Neodol 23-6.5, and the contents of the vessel are heated to 90° C. while blowing nitrogen through the liquid. Dropwise addition of 51 parts of acetic anhydride is begun, and the addition requires about 0.5 hour. An additional 5 parts of acetic anhydride are charged to the reaction mixture and the mixture is heated to 100° C. This procedure is repeated twice and the mixture is then maintained at about 100° C. for 2 hours whereupon the mixture is stripped to 135° C. at 30 mm Hg. The residue is filtered through a mixture containing about 10 parts of diatomaceous earth and about 3 parts of calcium hydroxide. The filtrate is the desired product. The filtrate has a neutralization acid number to phenolphthalein of 2.8 mg KOH and a neutralization base number to bromophenol blue of 0.3 mg HCl.

EXAMPLE 4

A mixture of 630 parts (1 equivalent) of Alfonic 1412-60, about 75 parts (about 1.0 equivalent) of formic acid, about 50 parts of toluene and 2 parts of para-toluenesulfonic acid is prepared and heated to 110° C. with stirring. Azeotropic water is collected over 8 hours, and the reaction mixture then is stripped to 100° C. The residue is filtered, and the filtrate is the desired ester. An infrared spectrum of the filtrate shows no hydroxyl group absorbance at about 3400 $cm^{-1}$.

EXAMPLE 5

A mixture of 133 parts (0.287 mole) of Alfonic 1012-60, 20 parts (0.33 mole) of acetic acid, about 50 parts of toluene and 5 parts of an acidified clay is prepared and heated to reflux. The mixture is maintained at the reflux temperature for about 12 hours. Sulfuric acid (2 parts) is added and the reaction is carried out for an additional 8 hours while removing water. The residue is filtered, and the filtrate is stripped at reduced pressure to yield a light amber oil which is the desired product.

EXAMPLE 6

Alfonic 1412-60 (127 parts, 0.25 mole) is charged to a reaction vessel, and 53 parts (0.26 mole) of trifluoroacetic acid are then added. An exothermic reaction results which raises the temperature to about 72° C. The mixture then is heated to about 110° C. for 1 hour and stripped under vacuum at 70° C. for about 1.5 hours. The residue is the desired product.

EXAMPLE 7

A mixture of 170 parts (2 moles) of cyanoacetic acid, 400 parts (2 moles) of tridecyl alcohol and 10 parts of a sulfuric acid treated clay is prepared, and the mixture is heated to about 150° C. Water is evolved very quickly and removed. The reaction mixture is cooled to 120° C. and maintained at this temperature for 6 hours. The product, after cooling, is filtered, and the filtrate is the desired product.

EXAMPLE 8

A mixture of 577 parts (1 mole) of Sandopan DTC (carboxylic acid of the general structure $R'(OCH_2CH_2)_nOCH_2COOH$ where $R'$ is aliphatic and n is an integer of from 1 to about 10), 119 parts (1 mole) of 2-methyl-2-nitropropanol and 10 parts of Amberlyst 15 catalyst is prepared and the temperature of the mixture is elevated. Water is evolved and removed from the reaction mixture. Maximum reaction temperature of 140° C. is attained as the water is removed. The residue is the desired product.

EXAMPLE 9

A mixture of 516 parts (3 moles) of decanoic acid and 357 parts (3 moles) of 2-methyl-2-nitropropanol is prepared, and the mixture is heated to about 150° C. Water is removed as it evolves. When all the water is removed, the reaction mixture is filtered, and the filtrate is the desired product.

Other esters of the type represented by Formulae (IV) and (V) can be prepared by procedures similar to the procedures in Examples 3-7 involving the reaction of a carboxylic acid $R'_2COOH$ and the hydroxy-containing compounds discussed above. Specific examples of acids and hydroxy-containing compounds which can be reacted to form the desired esters of this invention are illustrated in Table I.

TABLE I

| Example | $R'_2COOH$ | Hydroxy Compound |
|---|---|---|
| 10 | $S(CH_2CH_2C(O)-OH)_2$ | $HOCH_2CH_2CN$ |
| 11 | $O_2NCH_2CH_2COOH$ | $HOCH_2CF_3$ |
| 12 | $octyl(OCH_2CH_2)_6COOH$ | $N(CH_2CH_2OH)_3$ |
| 13 | $HOCH(CH_3)COOH$ | $HOCH_2CH_2NO_2$ |
| 14 | $CH_3OCH_2COOH$ | Neodol 23-6.5 |
| 15 | $CF_3COOH$ |  |
| 16 | succinic acid | Neodol 23-6.5 |

In another embodiment, the carboxylic ester comprises (C-3) at least one carboxylic ester of a polyhydroxy compound containing at least two hydroxy groups and characterized by the general formula $$R''(O(O)CR''_1)_r \qquad (VI)$$

wherein $R''$ is a hydrocarbyl group, each $R''_1$ is independently hydrogen, a straight chain lower hydrocarbyl group, a branched chain hydrocarbyl group, or a straight chain hydrocarbyl group containing from about 8 to about 22 carbon atoms provided that at least one $R''_1$ group is hydrogen, a lower straight chain hydrocarbyl or a branched chain hydrocarbyl group, or a carboxylic acid- or carboxylic ester-containing hydrocarbyl group, and r is at least 2.

The carboxylic ester is the reaction product of one or more carboxylic acids (or the lower esters thereof such as methyl, ethyl, etc.) with polyhydroxy compounds containing at least two hydroxy groups. The polyhydroxy compounds may be represented by the general formula $R''(OH)_r$ wherein $R''$ is a hydrocarbyl group and r is at least 2. The hydrocarbyl group may contain from 4 to about 50, more preferably from 4 to about 20, carbon atoms, and the hydrocarbyl group may also contain one or more nitrogen and/or oxygen atoms. The polyhydroxy compounds generally will contain from about 2 to about 10 hydroxy groups and more preferably from about 3 to about 10 hydroxyl groups. The polyhydroxy compound may contain one or more oxyalkylene groups, and, thus, the polyhydroxy compounds include compounds such as polyetherpolyols. The number of carbon atoms and number of hydroxy groups contained in the polyhydroxy compound used to form the carboxylic esters may vary over a wide range, and it is only necessary the carboxylic ester produced with the polyhydroxy compounds be soluble in the fluorine-containing hydrocarbon (A).

The polyhydroxy compounds used in the preparation of the carboxylic esters also may contain one or more nitrogen atoms. For example, the polyhydroxy compound may be an alkanol amine containing from 3 to 6 hydroxy groups. In one preferred embodiment, the polyhydroxy compound is an alkanol amine containing at least two hydroxy groups and more preferably at least three hydroxy groups.

Specific examples of polyhydroxy compounds useful in the present invention include ethylene glycol, diethylene glycol, triethylene glycol, propylene glycol, dipropylene glycol, glycerol, neopentyl glycol, 1,2-, 1,3- and 1,4-butanediols, pentaerythritol, dipentaerythritol, tripentaerythritol, triglycerol, trimethylolpropane, sorbitol, hexaglycerol, 2,2,4-trimethyl-1,3-pentanediol, etc. Mixtures of any of the above polyhydroxy compounds can be utilized.

The carboxylic acids utilized in the preparation of the carboxylic esters (C-3) of the present invention may be characterized by the following general formula $R''_1COOH$ wherein $R''_1$ is (a), H, (b), a straight chain lower hydrocarbyl group, (c) a branched chain hydrocarbyl group, or (d) a mixture of one or both of (b) and (c) with a straight chain hydrocarbyl group containing from about 8 to about 22 carbon atoms or (e) a carboxylic acid- or carboxylic acid ester-containing hydrocarbyl group. Stated otherwise, at least one $R''_1$ group in the ester of Formula (VI) must contain a lower straight chain hydrocarbyl group or a branched chain hydrocarbyl group. The straight chain lower hydrocarbyl group ($R''_1$) contains from 1 to about 7 carbon atoms, and in a preferred embodiment, contains from 1 to about 5 carbon atoms. The branched chain hydrocarbyl group may contain any number of carbon atoms and will generally contain from 4 to about 20 carbon atoms. In one preferred embodiment, the branched chain hydrocarbon group contains from 5 to 20 carbon atoms and in a more preferred embodiment, contains from about 5 to about 14 carbon atoms. The higher molecular weight straight chain hydrocarbyl group containing from 8 to about 22 carbon atoms will contain in some embodiments, from 8 to about 18 carbon atoms, and in more preferred embodiments from 8 to about 14 carbon atoms.

In one preferred embodiment, the branched chain hydrocarbyl groups are characterized by the structure

wherein $R''_2$, $R''_3$ and $R''_4$ are each independently alkyl groups, and at least one of the alkyl groups contains two or more carbon atoms. Such branched chain alkyl groups, when attached to a carboxyl group are referred to in the industry as neo groups and the acids are referred to as neo acids. In one embodiment, $R''_2$ and $R''_3$ are methyl groups and $R''_4$ is an alkyl group containing two or more carbon atoms.

Any of the above hydrocarbyl groups ($R''_1$) may contain one or more carboxy groups or carboxy ester groups such as $-COOR''_5$ wherein $R''_5$ is a lower alkyl, hydroxy alkyl or a hydroxy alkyloxy group. Such substituted hydrocarbyl groups are present, for example, when the carboxylic acid, $R_1COOH$, is a dicarboxylic acid or a monoester of a dicarboxylic acid. Generally, however, the acid R"COOH is a monocarboxylic acid since polycarboxylic acids tend to form polymeric products if the reaction conditions and amounts of reactants are not carefully regulated. Mixtures of monocarboxylic acids and minor amounts of dicarboxylic acids or anhydrides are useful in preparing the carboxylic esters.

Examples of carboxylic acids containing a straight chain lower hydrocarbyl group include formic acid, acetic acid, propionic acid, butyric acid, pentanoic acid, hexanoic acid and heptanoic acid. Examples of carboxylic acids wherein the hydrocarbyl group is a branched-chain hydrocarbyl group include 2-ethyl-n-butyric acid, 2-hexyldecanoic acid, isononanoic acid, isostearic acid, 2-methylhexanoic acid, 3,5,5-trimethylhexanoic acid, 2-ethylhexanoic acid, neoheptanoic acid, neodecanoic acid, and commercial mixtures of branched chain carboxylic acids such as a mixture of neododecanoic acid and neotetradecanoic acid having a molecular weight of approximately 206 by acid number identified as Neo 1214 acid from Exxon.

The third type of carboxylic acid which can be utilized in the preparation of the carboxylic esters are the acids containing a straight chain hydrocarbyl group containing from 8 to about 22 carbon atoms. As noted previously, these higher molecular weight straight chain acids can be utilized only in combination with one of the other acids described above since the higher molecular weight straight chain acids are not soluble in the fluorohydrocarbons. Examples of such higher molecular weight straight chain acids include decanoic acid, dodecanoic acid, stearic acid, lauric acid, behenic acid, etc. Examples of dicarboxylic acids include maleic acid, succinic acid, etc.

In another embodiment, the carboxylic acids utilized to prepare the carboxylic esters (C-3) may comprise a mixture of a major amount of monocarboxylic acids and a minor amount of dicarboxylic acids. The presence of the dicarboxylic acids results in the formation of esters of higher viscosity. The use of mixtures containing larger amounts of dicarboxylic acids should be avoided since the product ester will contain larger amounts of polymeric esters, and such mixtures may be insoluble in the fluorohydrocarbons. An example of such a mixture of 80 parts of neoheptanoic acid and 20 parts of succinic acid.

The carboxylic esters of Formula (VI) are prepared, as mentioned above, by reacting at least one carboxylic acid with at least one polyhydroxy compound containing at least two hydroxy groups. The formation of esters by the interaction of carboxylic acids and alcohols is acid catalyzed and is a reversible process which can be made to proceed to completion by use of a large amount of alcohol or by removal of the water as it is formed in the reaction. If the ester is formed by transesterification of a lower molecular weight carboxylic ester, the reaction can be forced to completion by removal of the low molecular weight alcohol formed as a result of a transesterification reaction. The esterification reaction can be catalyzed by either organic acids or inorganic acids. Examples of inorganic acids include sulfuric acids and acidified clays. A variety of organic acids can be utilized including para-toluenesulfonic acid, acidic resins such as Amberlyst 15, etc. Organometallic catalysts include, for example, tetraisopropoxy orthotitanate.

The amounts of carboxylic acids and polyhydroxy compounds included in the reaction mixture may be varied depending on the results desired. If it is desired to esterify all of the hydroxyl groups contained in the polyhydroxy compounds, sufficient carboxylic acid should be included in the mixture to react with all of the hydroxyl groups. When mixtures of the alcohols are reacted with a polyhydroxy compound in accordance with the present invention, the carboxylic acids can be reacted sequentially with the polyhydroxy compounds or a mixture of carboxylic acids can be prepared and the mixture reacted with the polyhydroxy comopunds. In one preferred embodiment wherein mixtures of acids are utilized, the polyhydroxy compound is first reacted with one carboxylic acid, generally, the higher molecular weight branched chain or straight chain carboxylic acid followed by reaction with the straight chain lower hydrocarbyl carboxylic acid. Throughout the specification and claims, it should be understood that the esters also can be formed by reaction of the polyhydroxy compound with the anhydrides of any of the above-described carboxylic acids. For example, esters are easily prepared by reacting the polyhydroxy compounds either with acetic acid or acetic anhydride.

The formation of esters by the reaction of carboxylic acids or anhydrides with the polyhydroxy compounds described above can be effected by heating the acids or anhydrides, the polyhydroxy compounds, and an acid catalyst to an elevated temperature while removing water or low molecular weight alcohols formed in the reaction. Generally, temperatures of from about 75° C. to about 200° C. or higher are sufficient for the reaction. The reaction is completed when water or low molecular weight alcohol is no longer formed, and such completion is indicated when water or low molecular weight alcohols can no longer be removed by distillation.

In some instances, it is desired to prepare carboxylic esters wherein not all of the hydroxyl groups have been esterified. Such partial esters can be prepared by the techniques described above and by utilizing amounts of the acid or acids which are insufficient to esterify all of the hydroxyl groups.

The following examples illustrate the preparation of additional carboxylic esters (C-3) which are useful in the liquid compositions of the invention.

EXAMPLE 17

A mixture of 872 parts (6.05 moles) of 2-ethyl-hexanoic acid, 184 parts (2 moles) of glycerol and 200 parts of toluene is prepared and blown with nitrogen while heating the mixture to about 60° C. Para-toluene sulfonic acid (5 parts) is added to the mixture which is then heated to the reflux temperature. A water/toluene azeotrope distills at about 120° C. A temperature of 125°–130° C. is maintained for about 8 hours followed by a temperature of 140° C. for 2 hours while removing water. The residue is the desired ester.

EXAMPLE 18

Into a reaction vessel there are charged 600 parts (2.5 moles) of triglycerol and 1428 parts (14 moles) of acetic anhydride. The mixture is heated to reflux in a nitrogen atmosphere and maintained at the reflux temperature (125°–130° C.) for about 9.5 hours. The reaction mixture is vacuum stripped at 150° C. and 15 mm Hg. The residue is filtered through a filter aid, and the filtrate is the desired ester.

EXAMPLE 19

A mixture of 364 parts (2 moles) of sorbitol, and 340 parts (2 moles) of a commercial $C_{8-10}$ straight chain methyl ester (Procter & Gamble), is prepared and heated to 180° C. The mixture is a two-phase system. Para-toluene sulfonic acid (1 part) is added, and the mixture is heated to 150° C. whereupon the reaction commences and water and methanol evolve. When the solution becomes homogeneous, 250 parts (2.5 moles) of acetic anhydride are added with stirring. The reaction mixture then is stripped at 150° C. and filtered. The filtrate is the desired ester of sorbitol.

EXAMPLE 20

A mixture of 402 parts (3 moles) of trimethylol propane, 660 parts (3 moles) of a commercial straight chain methyl ester comprising a mixture of about 75% $C_{12}$ methyl ester and about 25% $C_{14}$ methyl ester, (CE1270 from Procter & Gamble), and tetraisopropoxy orthotitanate is prepared and heated to 200° C. with mild nitrogen blowing. The reaction is allowed to proceed overnight at this temperature, and in 16 hours, 110 parts of methanol is collected. The reaction mixture is cooled to 150° C., and 100 parts of acetic acid and 50 parts of toluene are added followed by the addition of an additional 260 parts of acetic acid. The mixture is heated at about 150° C. for several hours yielding the desired ester.

EXAMPLE 21

A mixture of 408 parts (3 moles) of pentaerythritol and 660 parts (3 moles) of the CE1270 methyl ester used in Example 21 is prepared with 5 parts of tetraisopropyl orthotitanate, and the mixture is heated to 220° C. under a nitrogen purge. No reaction occurs. The mixture then is cooled to 130° C., and 250 parts of acetic acid are added. A small amount of para-toluenesulfonic acid is added and the mixture is stirred at about 200° C. for 2 days, and 60 parts of methanol are removed. At this time, 450 parts of acetic anhydride are added and the mixture is stirred at 150° C. until the acetic acid/water azeotrope no longer evolves. The residue is filtered through a filter aid, and the filtrate is the desired ester of pentaerythritol.

EXAMPLE 22

A mixture of 544 parts (4 moles) of pentaerythritol, 820 parts (4 moles) of Neo 1214 acid, a commercial acid mixture available from Exxon, 408 parts (4 moles) of acetic anhydride and 50 parts of Amberlyst 15 is prepared and heated to about 120° C. whereupon water and acetic acid begin to distill. After about 150 parts of water/acetic acid are collected, the reaction temperature increases to about 200° C. The mixture is maintained at this temperature for several days and stripped. Acetic anhydride is added to esterify any remaining hydroxyl groups. The product is filtered and the filtrate is the desired ester.

EXAMPLE 23

A mixture of 508 parts (2 moles) of dipentaerythritol, 812 parts (8 moles) of acetic anhydride, 10 parts of acidified clay as catalyst and 100 parts of xylene is prepared and heated to 100° C. This temperature is maintained until the solid dipentaerythritol is dissolved. A water/acetic acid azeotrope is collected, and when the rate of evolution diminishes, the reaction mixture is blown with nitrogen. About 100-200 parts of acetic acid are added and the reaction is continued as additional water/acetic acid/xylene azeotrope is collected. When an infrared analysis of the reaction mixture indicates a minimum of free hydroxyl groups, the reaction mixture is stripped and filtered. The filtrate is the desired product which solidifies.

EXAMPLE 24

A mixture of 372 parts (1 mole) of tripentaerythritol, 910 parts (7 moles) of neoheptanoic acid and 30 parts of Amberlyst 15 catalyst is prepared and heated to 110° C. as water is removed. The mixture is heated for a total of 48 hours, and unreacted acid is removed by stripping the mixture. The residue is the desired ester.

EXAMPLE 25

A mixture of 1032 parts (6 moles) of neodecanoic acid and 318 parts (3 moles) of diethylene glycol is prepared and heated to 130° C. in the presence of 20 parts of Amberlyst 15. After heating for 24 hours and removing about 90 parts of water, 20 parts of Amberlyst 15 are added and the reaction is conducted for another 24 hours. The residue is the desired ester.

EXAMPLE 26

A mixture of 200 parts (2 moles) of succinic anhydride and 62 parts (1 mole) of ethylene glycol is heated to 120° C., and the mixture becomes a liquid. Five parts of acidic clay are added as catalyst, and an exotherm to about 180° C. occurs. Isooctanol (260 parts, 2 moles) is added, and the reaction mixture is maintained at 130° C. as water is removed. When the reaction mixture becomes cloudy, a small amount of propanol is added and the mixture is stirred at 100° C. overnight. The reaction mixture then is filtered to remove traces of oligomers, and the filtrate is the desired ester.

EXAMPLE 27

A mixture of 294 parts (3 moles) of maleic anhydride and 91 parts (1.5 moles) of ethylene glycol is prepared and heated at about 80° C. whereupon a strong exotherm occurs and the temperature of the mixture is raised to about 120° C. When the temperature of the mixture cools to about 100° C., 222 parts (3 moles) of n-butyl alcohol and 10 parts of Amberlyst 15 are added. Water begins to evolve and is collected. The reaction mixture is maintained at 120° C. until 50 parts of water is collected. The residue is filtered, and the filtrate is the desired product.

EXAMPLE 28

A mixture of 1072 parts (8 moles) of trimethylolpropane, 2080 parts (16 moles) of neo-pheptanoic acid and 50 parts of Amberlyst 15 is prepared and heated to about 130° C. A water/acid azeotrope evolves and is removed. When about 250 parts of the azeotrope has been removed, 584 parts (4 moles) of adipic acid are added and the reaction continues to produce an additional 450 parts of distillate. At this time, 65 parts of trimethylolpropane are added to the mixture and additional water is removed. The residue is filtered and the filtrate is the desired ester.

The liquid compositions of the present invention are characterized as having improved thermal and chemical stability over a wide temperature range. Other additives, if soluble in the liquid, known to be useful for improving the properties of halogen-containing hydrocarbon refrigerants can be included in the liquid compositions of the present invention to improve the characteristics of the liquid as a refrigerant. However, hydrocarbon oils such as mineral oil generally are not included in and are most often excluded from the liquid compositions of the invention, particularly when the fluorine-containing hydrocarbon contains no other halogen.

The additives which may be included in the liquid compositions of the present invention to enhance the performance of the liquids include extreme-pressure and anti-wear agents, oxidation and thermal-stability improvers, corrosion-inhibitors, viscosity improvers, pour point and/or floc point depressants, detergents, dispersants, anti-foaming agents, viscosity adjusters, etc. As noted above, these supplementary additives must be soluble in the liquid compositions of the invention. Included among the materials which may be used as extreme-pressure and anti-wear agents are phosphates, phosphate esters, phosphites, thiophosphates such as zinc diorganodithiophosphates, dithiocarbamates, chlorinated waxes, sulfurized fats and olefins, organic lead compounds, fatty acids, molybdenum complexes, borates, halogen-substituted phosphorous compounds, sulfurized Diels Alder adducts, organic sulfides, metal salts of organic acids, etc. Sterically hindered phenols, aromatic amines, dithiophosphates, phosphites, sulfides and metal salts of dithioacids are useful examples of oxidation and thermal stability improvers. Compounds useful as corrosion-inhibitors include organic acids, organic amines, organic alcohols, metal sulfonates, organic phosphites, etc. Viscosity improvers include polyolefins such as polybutene, polymethacrylates, etc. Pour point and floc point depressants include polymethacrylates, ethylene-vinyl acetate copolymers, maleamic acid-olefin copolymers, ethylene-alpha-olefin copolymers, etc. Detergents include sulfonates, long-chain alkyl-substituted aromatic sulfonic acids, phosphonates, phenylates, metal salts of alkyl phenols, alkyl phenolaldehyde condensation products, metal salts of substituted salicylates, etc. Silicone polymers are a well known type of anti-foam agent. Viscosity adjusters are exemplified by polyisobutylene, polymethacrylates, polyalkyl styrenes, naphthenic oils, alkyl benzene oils, polyesters, polyvinyl chloride, polyphosphates, etc.

The liquid compositions of the present invention are particularly useful as refrigerants in various refrigeration systems which are compression-type systems such as refrigerators, freezers, and air-conditioners including automotive, home and industrial air-conditioners. The following examples are illustrative of the liquid compositions of the present invention.

The liquid compositions of the present invention are particularly useful as refrigerants in various refrigeration systems which are compression-type systems such as refrigerators, freezers, and air-conditioners including automotive, home and industrial air-conditioners. The following examples are illustrative of the liquid compositions of the present invention.

|  | Parts by Wt. |
|---|---|
| Example A |  |
| 1,1,1,2-tetrafluoroethane (R134a) | 90 |
| Product of Example 1 | 10 |
| Example B |  |
| 1,1,2,2-tetrafluoroethane | 85 |

|  | Parts by Wt. |
|---|---|
| Product of Example 1 | 5 |
| Product of Example 4 | 10 |
| Example C |  |
| 1,1,1,2-tetrafluoroethane | 95 |
| Product of Example 2 | 5 |
| Example D |  |
| R134a | 80 |
| Product of Example 1 | 4 |
| Product of Example 17 | 16 |
| Example E |  |
| R134a | 85 |
| Product of Example 2 | 5 |
| Polyoxypropylene glycol* | 10 |
| Example F |  |
| R134a | 80 |
| Product of Example 2 | 5 |
| Polyoxypropylene glycol* | 7.5 |
| Product of Example 3 | 7.5 |

*(NIAX-425 available from Union Carbide)

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A composition comprising:
   (A) at least 50% by weight of a fluorine-containing hydrocarbon having one or two carbon atoms; and
   (B) from about 9% to about 30% by weight of a phosphorus-containing lubricant composition comprising at least one compound characterized by the formula

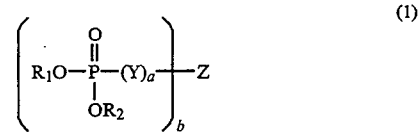

wherein $R_1$ and $R_2$ are each independently hydrocarbyl groups or hydrocarbyloxyalkylene groups and $R_1$ and $R_2$ taken together have from 2 to about 24 carbon atoms excluding any oxyalkylene carbon atoms;

a is 0 b is 1 z is $-R_5$ and

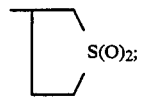

Y is a hydrocarbylene group having 1 to about 20 carbon atoms; and $R_5$ is a hydrocarbyl group having 1 to about 18 carbon atoms.

2. The composition of claim 1 wherein the fluorine-containing hydrocarbon (A) is 1,1,1,2-tetrafluoroethane.

3. The composition of claim 1 wherein $R_1$ and $R_2$ are each independently alkyl groups or hydrocarbyloxyalkylene groups and further wherein $R_1$ and $R_2$ taken together have a total of 2 to about 18 carbon atoms, excluding any oxyalkylene carbon atoms.

4. The composition claimed in claim 3 wherein $R_1$ and $R_2$ are each independently straight chain alkyl groups having from 1 to about 4 carbon atoms or branched chained alkyl groups having from 1 to about 8 carbon atoms.

5. The composition of claim 3 wherein $R_1$ and $R_2$ are each independently methyl, ethyl, propyl or butyl groups.

6. The composition of claim 1 wherein $R_5$ is selected from the group consisting of an alkyl having from 1 to about 18 carbon atoms and an hydrocarbyloxyalkylene group having from 1 to about 18 carbon atoms in the hydrocarbyl portion of the group.

7. The composition of claim 1 wherein $R_5$ is an alkyl having from about 8 to about 14 carbon atoms.

8. The composition of claim 1, further comprising:
   (C) at least one polyoxyalkylene glycol or at least one carboxyl ester.

9. A method of lubricating metal parts comprising contacting the metal parts with the composition of claim 1.

10. A method of lubricating metal parts comprising contacting the metal parts with the composition of claim 4.

11. A method of lubricating metal parts comprising contacting the metal parts with the composition of claim 8.

* * * * *